US007441120B2

(12) United States Patent
DiSanto et al.

(10) Patent No.: US 7,441,120 B2
(45) Date of Patent: Oct. 21, 2008

(54) TELECOMMUNICATIONS DEVICE AND METHOD

(75) Inventors: Frank J. DiSanto, North Hills, NY (US); Denis A. Krusos, Melville, NY (US); Edward Lewit, Melville, NY (US)

(73) Assignee: CopyTele, Inc., Melville, NY (US)

( * ) Notice: Subject to any disclaimer, the term of this patent is extended or adjusted under 35 U.S.C. 154(b) by 622 days.

(21) Appl. No.: 11/058,402

(22) Filed: Feb. 15, 2005

(65) Prior Publication Data

US 2005/0223215 A1 Oct. 6, 2005

Related U.S. Application Data

(63) Continuation of application No. 10/096,811, filed on Mar. 13, 2002, now Pat. No. 6,856,686, which is a continuation-in-part of application No. 09/336,948, filed on Jun. 21, 1999, now Pat. No. 6,430,691.

(51) Int. Cl.
*G06F 9/00* (2006.01)

(52) U.S. Cl. ....................................... 713/168; 713/189

(58) Field of Classification Search ................. 713/168, 713/189

See application file for complete search history.

(56) References Cited

U.S. PATENT DOCUMENTS 5,222,136 A 6/1993 Rasmussen et al.
5,410,599 A 4/1995 Crowley et al.
5,455,861 A 10/1995 Faucher et al.

*Primary Examiner*—Thomas R Peeso
(74) *Attorney, Agent, or Firm*—The Plevy Law Firm

(57) ABSTRACT

A method for selectively enhancing a voice telephone call from a first location to a second location over a public switched telephone network, including receiving audio signals from a conventional telephone using a first device positioned at the first location; and, in a first mode, passing the received audio signals to the public switched telephone network in a substantially unaltered manner; and, in a second mode, generating data indicative of the received audio signals using the first device; multiplexing the generated data with other data desired to be communicated using the first device; and, transmitting the multiplexed data over the public switched telephone network; wherein, the transmitted data is suitable for being received from the public switched telephone network and de-multiplexed to generate reproduced audio signals indicative of the received audio signals and the other data by a second like device.

3 Claims, 12 Drawing Sheets

TELECOMMUNICATIONS DEVICE AND METHOD

RELATED APPLICATIONS

This application is a continuation of commonly assigned U.S. patent application Ser. No. 10/096,811, filed Mar. 13, 2003, now U.S. Pat. No. 6,856,686 which is a continuation-in-part of commonly assigned U.S. patent application Ser. No. 09/336,948, entitled "STAND-ALONE TELECOMMUNICATIONS SECURITY DEVICE" filed Jun. 21, 1999, now U.S. Pat. No. 6,430,691, the entire disclosures of each of which are hereby incorporated by reference as if being set forth in their respective entireties herein.

FIELD OF INVENTION

The present invention relates to telecommunications devices, and more particularly to a device adapted for use with audible, facsimile and data transmissions.

BACKGROUND OF THE INVENTION

As the demand for increased security of telecommunications systems grows, so that unauthorized interception of audible, data, facsimile and other electronically transmitted information is minimized, so does the need for devices capable of satisfying these demands. For example, a potential user may telecommute from a home office and use voice, computerized data and facsimile communications. Therefore, it is desirable to have some way for securing each communication of these types to prevent or at least impede unauthorized access thereto. If the telecommuting user telephones a second user, and in the course of their discussions decides to discuss sensitive information, he may wish to encrypt information in an attempt to frustrate unauthorized interception thereof. Further, in the course of the conversation he may wish to send or receive a facsimile. Further yet, it may be desirable that this facsimile also be encrypted. Therefore, it is desirable that the ability be provided to send and/or receive facsimile transmissions without being required to terminate the telephone call and initiate a new call.

Further yet, it is also desirable to permit the transfer of at least one computer file between the users, in such case it may again desirable to be able to encrypt the same and not require the users to initiate a new communications session, but rather just continue the original session. Finally, as many users already possess telephones, facsimile machines and computers, it is desirable to provide a security device capable of performing these functions in connection with these existing devices.

Accordingly, it is an object of the present invention to provide a method and system for enabling encryption of data in a manner that provides increased security. It is a further object of the present invention to provide a method and system adapted to acquire security keys directly from one another and encrypt e-mail using these keys.

SUMMARY OF INVENTION

A method for selectively enhancing a voice telephone call from a first location to a second location over a public switched telephone network, including receiving audio signals from a conventional telephone using a first device positioned at the first location; and, in a first mode, passing the received audio signals to the public switched telephone network in a substantially unaltered manner; and, in a second mode, generating data indicative of the received audio signals using the first device; multiplexing the generated data with other data desired to be communicated using the first device; and, transmitting the multiplexed data over the public switched telephone network; wherein, the transmitted data is suitable for being received from the public switched telephone network and de-multiplexed to generate reproduced audio signals indicative of the received audio signals and the other data by a second like device.

The multiplexed data may be encrypted prior to transmitting the same via the public switched telephone network, such that the transmitted data is decrypted prior to demultiplexing.

DETAILED DESCRIPTION OF THE INVENTION

Figure 1:
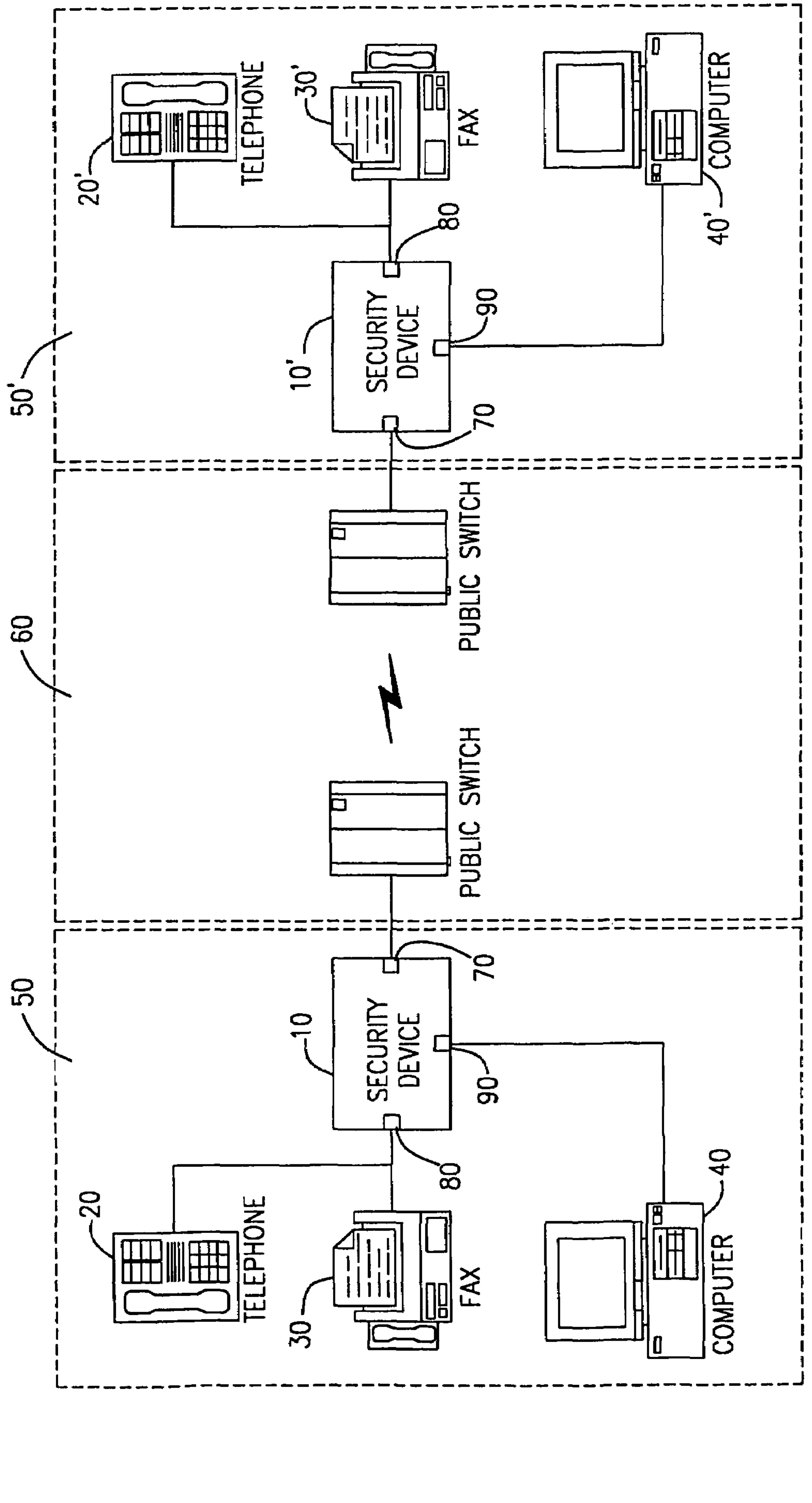
FIG. 1 illustrates an overview of a communications system according to the present invention.

Referring now to the numerous figures, wherein like references refer to like elements and steps according to the instant invention, FIG. 1 illustrates a telecommunications system configuration which includes security devices 10, 10' according to the instant invention. For sake of explanation, the following discussion will utilize a prime (') description for those elements and steps relating to a second like device. Therein a first user at a first location 50 has access for example to a first security device 10, telephone 20, facsimile machine 30 and computer 40. The second user at a location 50' has access to a second security device 10', telephone 20', facsimile machine 30' and computer 40'. The first user's devices (10, 20, 30, 40) can be interconnected to the second user's devices (10', 20', 30', 40') using any conventional communications system 60, for example a conventional public switched telephone network ("PSTN"). Alternatives for a PSTN include the Internet for example or any other suitable configuration, i.e. wireless for example.

As set forth, it is desirable that the first user and second user, in a single communications session be able to communicate in both encrypted and non-encrypted modes over the telephones 10 and 10', transmit and receive documents either in an encrypted or non-encrypted mode using facsimile machines 30 and 30' and transfer electronic documents, either in an encrypted or non-encrypted mode using the computers 40 and 40'.

Figure 2:
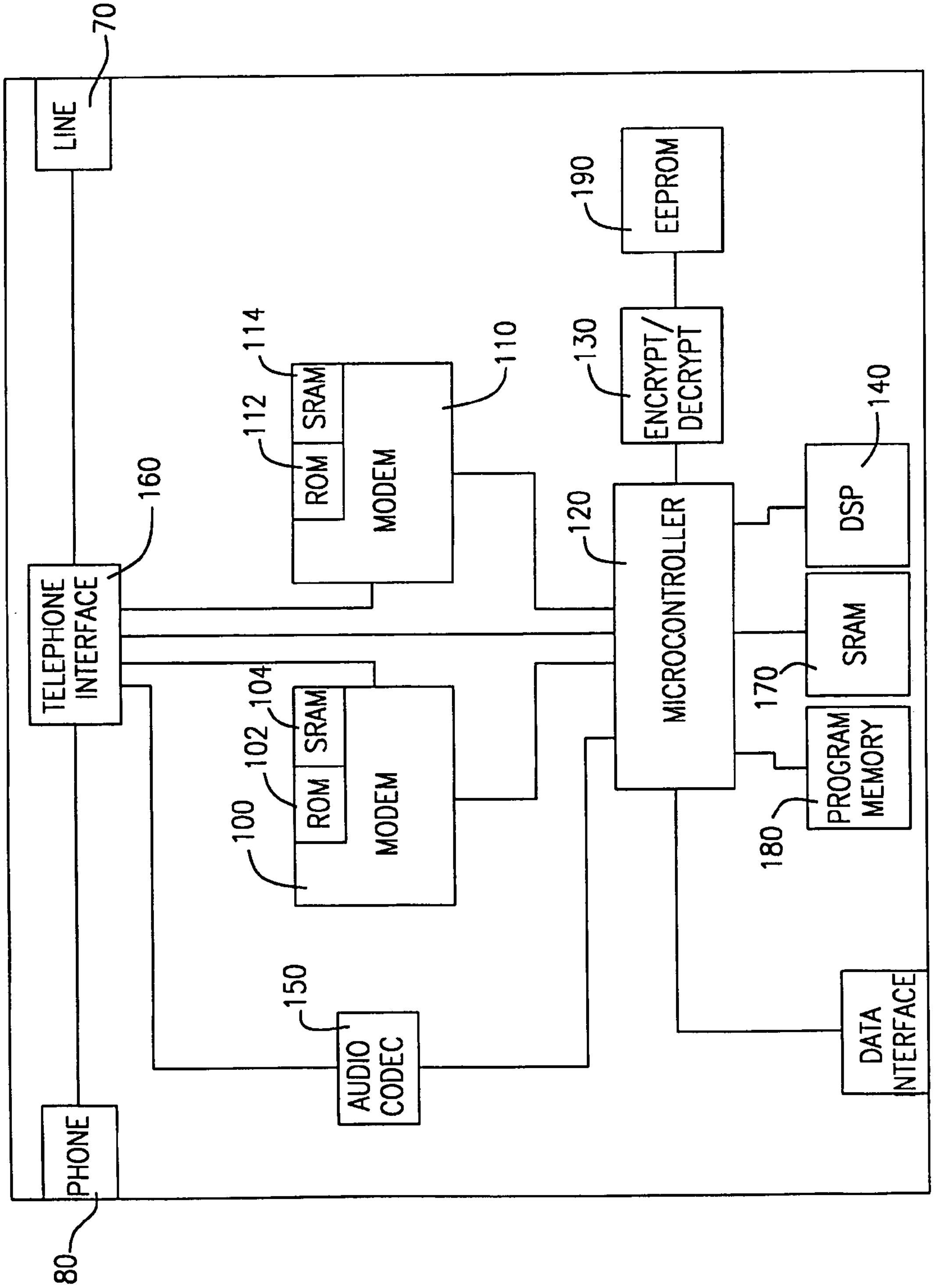
FIG. 2 illustrates a block diagram of a telecommunications security device according to the instant invention.

Referring now also to FIG. 2, therein is illustrated a block diagram of a preferred form of the security device 10 according to the instant invention. Preferably the device 10 includes at least three input/output (I/O) ports. These include a line port 70, phone port 80 and data port 90. Alternatively, an additional phone port could be provided for purposes of providing separate facsimile and voice ports to further permit multiplexing voice and fax information as will be discussed further. The line and phone ports (70, 80) are preferably standard RJ-11 type ports, however other configurations may be adopted to complement the choice of communications system 60 and devices 20, 30, 40. The line port 70 is preferably coupled to the communications network 60, while the phone port 80 is preferably coupled to a telephone 20 and/or facsimile machine 30 (depending upon what devices 20, 30 are available and whether a separate port has been provided for facsimile machine 30 for example).

The data port 90 preferably takes the form of a serial I/O port, i.e. RS-232, which is adapted to permit direct communications between the computer 40 and security device 10 for example. It should be recognized though that the choice of data port 90 to be an RS-232 type port further permits security device 10 to be electronically coupled to any device capable of communicating with it there over, for example virtually any computer, personal data assistant or other proprietary device adapted to communicate over an RS-232 interface. However, other suitable interfaces can of course be utilized (wireless for example).

The device 10 preferably incorporates two (2) modems 100 and 110 each coupled to the telephone interface 160, at least one of which is preferably at least 56K and v.90 compatible as is understood by those skilled in the art (preferably 110). Obviously, the faster and more reliably these modems can perform, the better overall system performance will be. Modem 100 is adapted to communicate with a device attached to the phone port 80, i.e. facsimile machine 30, while modem 110 is adapted to communicate with a counterpart modem 110' of a second security device (i.e. 10').

The device 10 preferably further includes a microcontroller 120 coupled to the modems 100, 110, data port 90, encryption/decryption device 130, digital signal processor ("DSP") 140, audio codec 150, telephone interface 160, SRAM 170 and program memory 180. Preferably the microcontroller 120 serves to control and pass data to and from these elements, as is well known. The microcontroller 120 preferably also performs multiplexing of data from separate sources (i.e. fax/data/voice). Preferably the digital signal processor ("DSP") 140 serves to generate encryption/decryption codes. Preferably, the encryption/decryption device 140 serves to encrypt and decrypt data consistent with these encryption/decryption codes as is well known, and is preferably coupled to a EEPROM 190 to facilitate this purpose. The program memory 180 preferably stores the microcontroller's 120 program and the SRAM 170 serves as a memory unit for operation of the microcontroller. Preferably the microcontroller 120 takes the form of a model Intel N80C251SB16 and the DSP 140 takes the form of a model TI TMS320C542PGE2-40. As is well known, modems 100, 110 utilize ROMs 102, 112 and SRAMs 104, 114, which may either be internal or external to the modems 100, 110 as is known.

Figure 3:
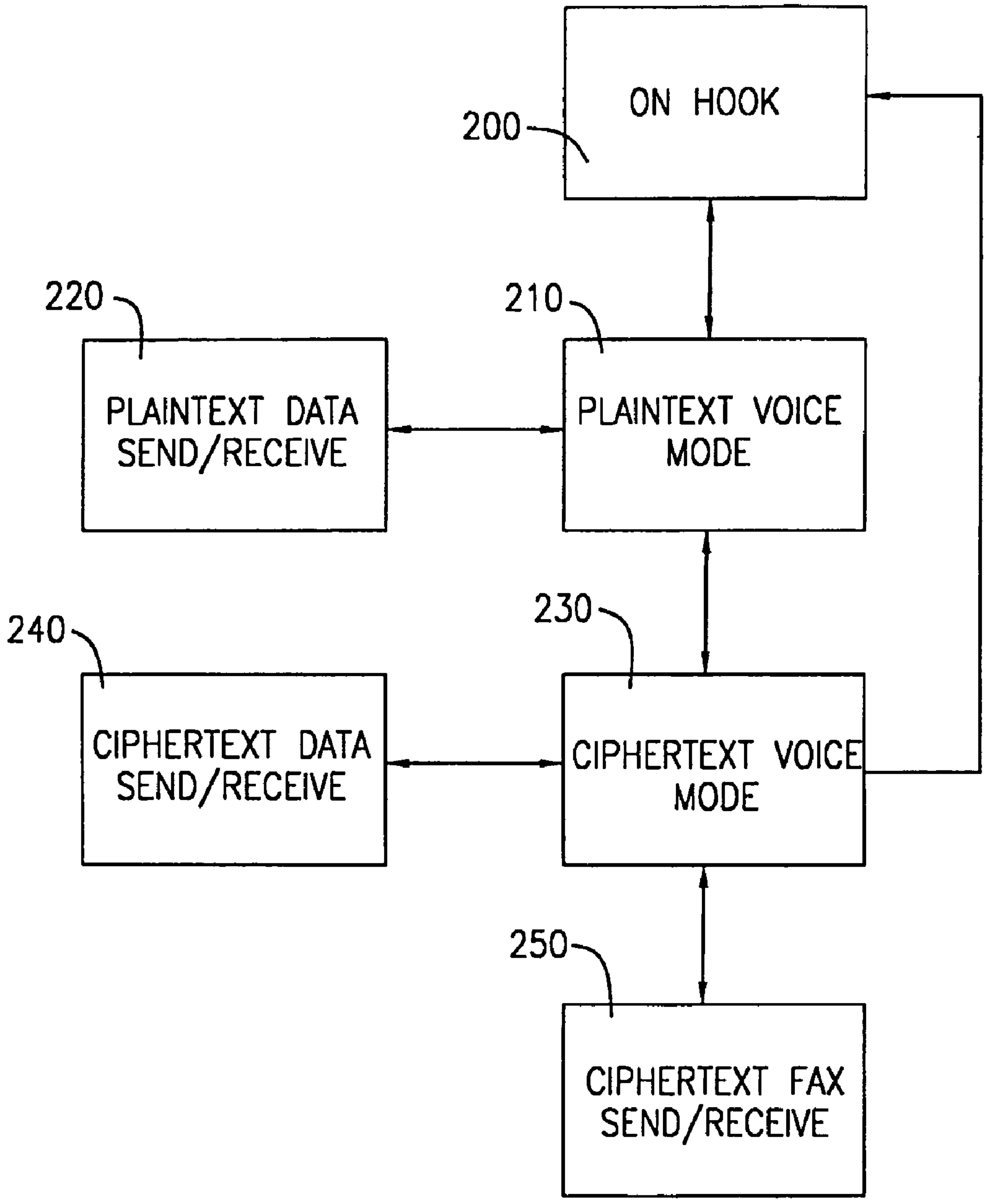
FIG. 3 illustrates an overview of operation of the security device of FIG. 2 according to the instant invention.

Referring now also to FIG. 3, preferably upon initial connection to one another, two devices (i.e. 10 and 10') enter a non-encrypted ("plaintext") mode, after which a user may switch over to encrypted ("ciphertext") mode. It should be recognized in the preferred embodiment of the present invention, it doesn't matter which device 10, 10' initiates a request to enter ciphertext mode, thus permitting one of the devices 10, 10' to operate unattended by receiving an indication of a request to enter ciphertext mode from the other attended device 10, 10'.

Each device 10, 10' preferably enters a standby, on-hook mode (i.e. 200, 200') until an off-hook condition or ring in is detected. Thereafter each device 10, 10' preferably and respectively enters a plaintext voice mode (i.e. 200, 200'). In this mode audio and facsimile communications pass through the devices 10 and 10' without any change thereto. If computer or proprietary data is to be transmitted in the clear, i.e. without encryption, the devices 10, 10' preferably and respectively enter a plaintext data mode 220, 220'. If the users of the devices 10, 10' wish to secure communication between them, the devices preferably and respectively enter a ciphertext voice mode 230, 230'. If the users wish to transfer data in an encrypted format the devices preferably and respectively enter a ciphertext data mode 240, 240'. Finally, if the users want to share a secured facsimile transmission the devices 10, 10' preferably and respectively enter ciphertext fax modes 250, 250'.

For sake of clarity, a preferred form of the invention will now be described with reference to a communications session between two users, although it is to be understood that the present disclosure of the preferred form has been made only by way of example, and that numerous changes in the details of construction and combination and arrangement of parts may be made without departing from the spirit and scope of the invention.

Plaintext Mode

Voice, facsimile and data transfer modes (i.e. computer-to-computer) are all preferably available in plaintext mode. In plaintext voice mode, the first user is, for example, using telephone 20 to communicate with another telephone (i.e. 20'). Essentially, the ports 70 and 80 are coupled together, allowing device 10 to appear transparent to the users. While in plaintext voice mode, either user may instruct his respectively associated device 10 to enter ciphertext mode, for example by activating or pressing a button on the device 10. Thereafter, the device 10, 10', which was directly instructed to enter ciphertext mode by a user can signal the other device 10, 10' to in turn enter ciphertext mode using conventional methodology. Alternatively, both users may respectfully instruct their respectively associated device 10, 10' that they wish to enter the ciphertext mode, for example by each activating or pressing a button on their respective device 10, 10'.

Either way, responsively thereto the devices 10 and 10' exchange keys as will be discussed and enter the ciphertext mode as set forth below. If a modem request is received via data port 90, modem 110 is preferably further adapted to operate as a standard external computer modem using the port 70 for the device initiating the request via the data port 90. In other words, it is operable as a standard external modem for a computer 40 for enabling it to contact other computers or connect to the Internet for example. Similarly, the facsimile machine 30 can communicate through the communications system 60 via the ports 70 and 80 and the computer 40 could alternatively communicate using an internal facsimile and/or modem card though the communications system 60 via the ports 70 and 80 for example.

Figure 4:
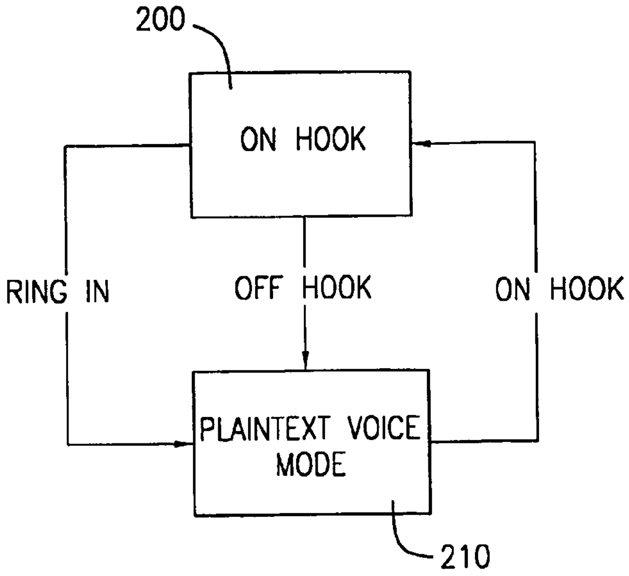
FIG. 4 illustrates a first operations flow diagram according to the instant invention.

Referring now to FIG. 4, therein is disclosed a flow diagram according to a preferred form of the present invention which first illustrates a phone-on hook, or stand-by mode 200.

The device 10, for example by monitoring a line voltage, can determine whether the phone line coupled through ports 70 and 80 is on or off hook, as is well known to those possessing ordinary skill in the art. When the phone goes off-hook, for example when a user lifts the handset of telephone 20 or a facsimile session is attempted to be commenced using facsimile machine 30, the device detects this and proceeds to enter an off-hook status/plaintext voice mode 260. On the reverse end of the call commenced using the device 10, or receiving end, device 10' identifies a ring-in condition upon an incoming call, again for example by monitoring the line voltage as is well known. If the call terminates without a connection the device 10 (originating) senses that the phone is on-hook again and returns to on-hook default or standby mode 200 and device 10' detects ring-in end and also returns itself to on-hook default mode 200.

Alternatively, if the incoming call is picked up by a user, the device 10' detects the off-hook condition and enters an off-hook plaintext voice mode 260'. A plaintext voice mode is now commenced for example, as the originating device 10 is in plaintext voice mode 260 and the destination device 10' is in plaintext voice mode 260'. In this plaintext voice mode 260 for the originating device 10 and 260' for the destination device 10', either device 10 or 10' can send or receive a data file via the data ports 90, 90'.

Figure 5:
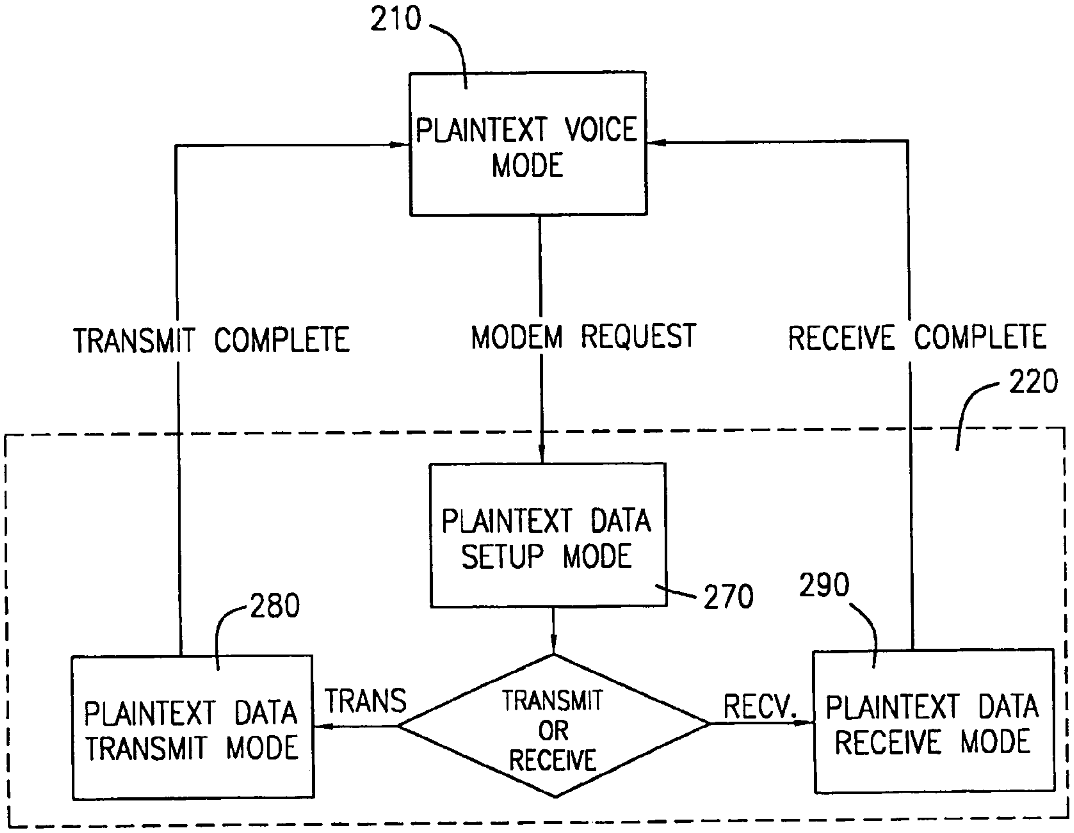
FIG. 5 illustrates a second operations flow diagram according to the instant invention.

Referring now also to FIG. 5, for sake of example, if the user of the device 10 wishes to transmit a file from the computer 40 to the computer 40', the device 10 receives an instruction, i.e. modem request, through the data port 90 and enters a plaintext data setup mode 270, wherein modem 110 thereof would couple to the line port 70, the audio codec 150 couples to the phone port 80 for reasons as will be set forth later and data is directed between the modem 110 and data port 90 by the microcontroller 120. Alternatively, a driver operating on the computer 40 could be used to direct interaction between the device 10 and computer 40 consistently with conventional methods. In turn the device 10' detects a receive file command, either from the user thereof through the port 90' or upon indication thereof from the device 10, and enters a plaintext data setup mode 270', wherein modem 110' thereof couples to the line port 70', the audio codec 150' couples to the phone port 80' for reasons as will be set forth later and data is transmitted between the modem 110' and data port 90'.

Thereafter, device 10 enters a data transmit mode 280 and device 10' enters data receive mode 290' wherein a file is transmitted from computer 40, through port 90, into device 10, to modem 110, through telephone interface 160 out port 70, into port 70', through telephone interface 160' to modem 110', out port 90' and into computer 40'. After the file transfer is complete, the devices 10, 10' preferably return to plaintext voice modes 260, 260'. Of course, a file could be transmitted from computer 40' to computer 40 in the same manner, i.e. device 10' going into plaintext data transmit mode 280' and device 10 going into plaintext data receive mode 290 and eventually back to plaintext voice modes 260 and 260'.

Alternatively, a user may wish to send a plaintext facsimile, in such case the modems of the facsimile machines 30 and 30' preferably negotiate a communications session therebetween and transmit the document as is well known. It should be noted that the devices 10 and 10' remain transparent to the facsimile machines 30 and 30' and hence the users thereof in the plaintext mode. Hence, in plaintext mode, the users of the devices continue to operate telephones 20, 20', facsimile machines 30, 30' and computers 40 and 40' conventionally, which of course makes the devices 10, 10' easier to use.

When the users select to end their conversation, they simply hang up the telephones and both devices detect an on-hook condition and return to on-hook standby mode 200, 200' for example.

Ciphertext Mode

As set forth, in the plaintext voice mode 160, 260' either or both users can instruct the devices 10, 10' that he wishes to enter a secured or ciphertext mode by pressing a button on his respectively associated device 10 or 10' for example. It should be recognized that the device 10 could further be adapted to monitor voice, facsimile and data transmissions in the plaintext mode for instructions to convert over to the ciphertext mode, the drawbacks of such a configuration however include that it requires the device 10 monitor the line in case the other device 10' attempts to convert over to ciphertext mode during facsimile or data transmissions, which in turn requires more complex circuitry and programming. Alternatively, the device 10 could begin, or default in ciphertext mode upon commencement of a communications session with a second user also utilizing a security device according to the present invention, i.e. device 10'.

Figure 6:
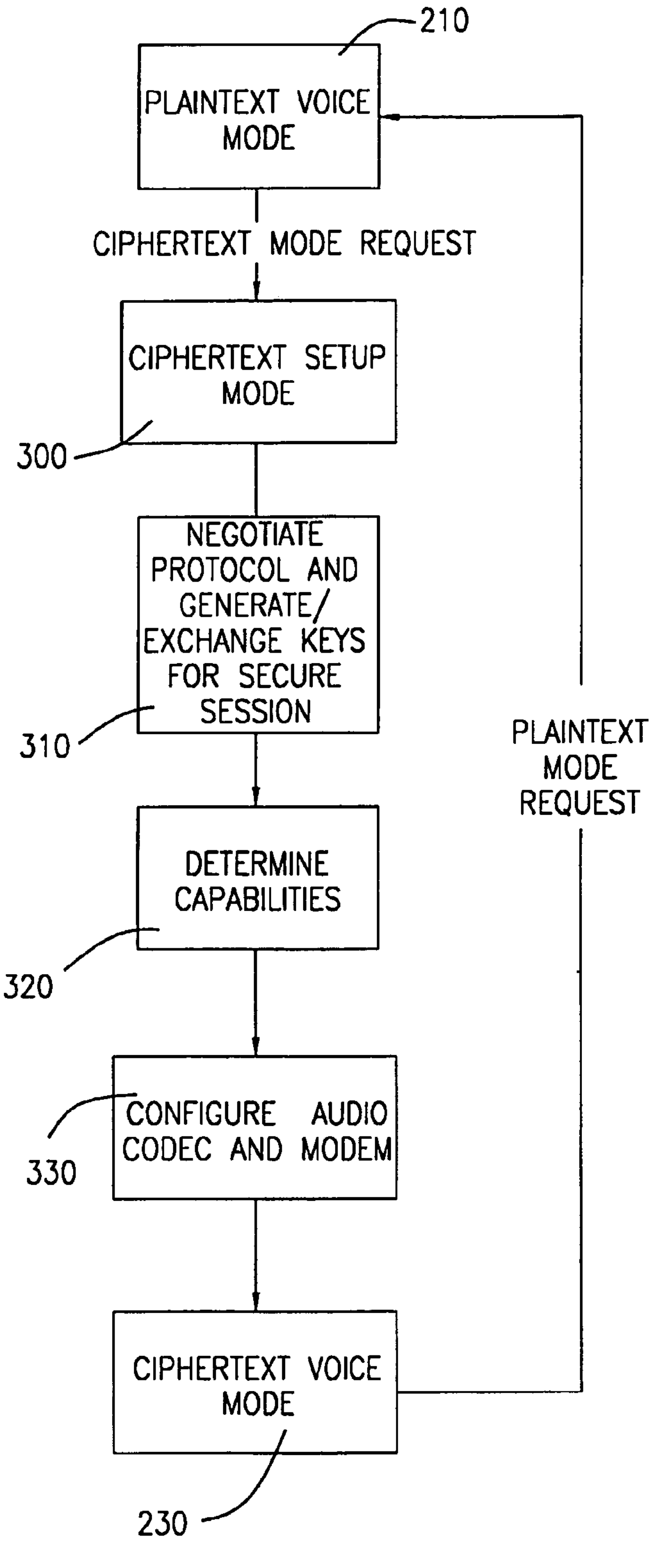
FIG. 6 illustrates a third operations flow diagram according to the instant invention.

Referring now to FIG. 6, and again to the communication session as discussed regarding plaintext voice mode and FIG. 4, once the users have connected the devices 10 and 10' in the plaintext voice modes 260 and 260' as has been set forth, they may wish to commence secured operation, for example by at least one user pressing a button to which the devices 10 and 10' are instructed to enter a ciphertext, or secured operation mode. Upon indication that the user wants to enter ciphertext mode, the device 10 enters a ciphertext setup mode 300 wherein the phone port 80 is coupled to the audio codec 150, modem 110 is coupled to the line port 70 to facilitate connection thereof with device 10' and modem 100 monitors the phone port 80. Similarly, device 10' enters ciphertext setup mode 300' wherein the phone port 80' is coupled to the audio codec 150', modem 110' is coupled to the line port 70' to facilitate connection thereof with device 10 and modem 100' monitors the phone port 80'.

After these steps have been performed, the modems 110, 110' of the security devices 10, 10' negotiate a protocol to be used for communications there between using conventional techniques as is well known 310. After the modems 110, 110' have negotiated a protocol for a secured session which is commenced between them, the capabilities of this secured session are preferably reported to each microcontroller 120, 120' by the respectively modem 110, 110'. Each microcontroller 120, 120' preferably then, determines the capabilities of the secured communications session commenced 320 and directs 330 the mode of operation of the modem 100, 100' and audio codecs 150, 150'. Each modem 100, 110' and audio codec 150, 150' can be controlled to operate in different modes as is well known. For example, the speed at which each modem 100, 100' operates is controllable, as is a level of quality for the audio codecs 150, 150'. Preferably, the higher the capabilities of the secured session (i.e. higher the speed, better error correction) the faster the modems 100, 100' can operate and the higher the level of quality the audio codecs can be operated in. Preferably for example, if a 33.6 Kbps connection can be established for the secure session, the modems 100, 100' can operate at up to 14.4 Kbps and the audio codecs 140, 140' can be operated in their highest level of quality. If a slower connection is established for the secure session between the devices 10, 10', the modems 100, 100' are preferably operated in a slower mode (i.e. 9600 bps) and the operational mode of the codecs 150, 150' can be suitably adjusted.

Encrypt/decrypt devices 130, 130' of the devices 10, 10' preferably exchange keys to permit for secured communications between the devices 10, 10' after a session protocol has been negotiated (illustrated in element 310). Referring again to FIG. 1, using such a configuration allows for all communications occurring over the communications system 60, i.e. between the users' locations 50, 50', to be encrypted to prevent, or at least impede unauthorized interception therefrom. After these steps have been performed, the device 10 enters ciphertext voice mode 340 and device 10' enters corresponding ciphertext voice mode 340'. As set forth, if an on-hook detection is made by either device 10, 10', eventually both devices 10, 10' are returned to on-hook standby mode 200. Alternatively, either, or both users may opt to return to plaintext voice modes 260, 260'. In such a case, for example by activating the same button as for entering ciphertext mode, a user can instruct the device to return to plaintext voice mode 260, 260'.

Figure 7:
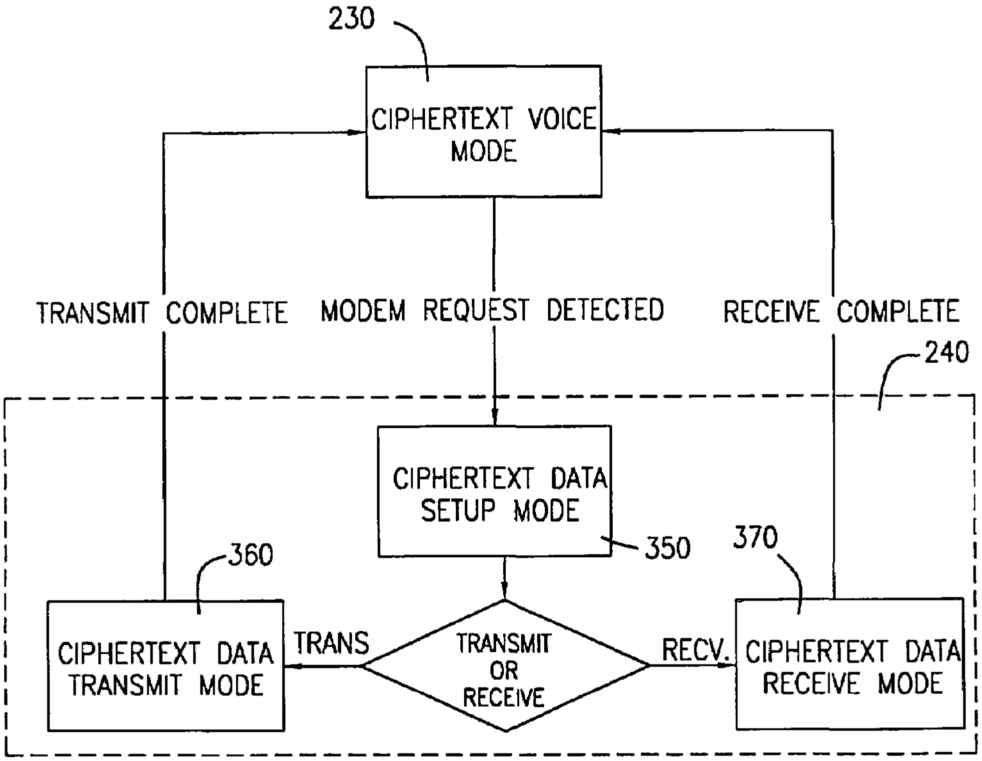
FIG. 7 illustrates a fourth operations flow diagram according to the instant invention.

Referring now also to FIG. 7, in the ciphertext voice mode (300, 300') voice communications from telephone 20 are, for example, received by the device 10 through port 80 and fed through the telephone interface 160 to the audio codec 150 for digitization, the digitized voice is then directed by the microcontroller 120 to the encrypt/decrypt device 130 which encrypts the digitized voice consistently with the keys which have been exchanged between the devices 10 and 10' previously. This encrypted data is then directed by the microcontroller 120 to the modem 110 and through telephone interface 160 to line port 70 for transmission across communications system 60 to device 10'. In turn, device 10' receives the transmitted, encrypted, digitized voice signal through port 70', telephone interface 160' and modem 110'. This encrypted, digitized voice signal is then directed by the microcontroller 120' to the encrypt/decrypt device 130' which decrypts it consistent with the key which has been generated and exchanged. The decrypted digitized voice signal is then directed by the microcontroller 120' to the audio codec 150' which un-digitizes it, or converts the signal to a conventional analog telephone signal which is in turn fed to the telephone interface 160' and phone port 80'. The signal can then be heard by a user utilizing telephone 20'. Encrypted voice communications from telephone 20' to telephone 20 are conducted in a reverse direction but identical manner. In the ciphertext model 340, 340' either computer 40 or 40' can preferably send or receive a data file via the respective data port 90, 90'. For sake of example, and referring again to the same communications session between a user of device 10 and a user of device 10', if the user of the device 10 wishes to transmit a file from the computer 40 to the computer 40', the device 10 receives an instruction from the data port 90 and enters a ciphertext data setup mode 350, wherein modem 110 maintains the secure session over the line port 70, the audio codec 150 couples to the phone port 80 for reasons as will be set forth later and data is transmitted between the modem 110 and data port 90.

Likewise, the device 10' detects a modem request, either from the user thereof or from the device 10 for example, and enters a ciphertext data setup mode 350', wherein modem 110' also maintains the secure session over line port 70', the audio codec 150' couples to the phone port 80' for reasons as will be set forth later and data is transmitted between the modem 110' and data port 90'. Thereafter, device 10 enters a ciphertext data transmit mode 360 and device 10' enters ciphertext data receive mode 370'. Therein, a file is transmitted from computer 40 through port 90 into device 10, directed by the microcontroller 120 to the encrypt/decrypt device 130 for encryption consistent with the previously negotiated security key, modulated by modem 110 and transmitted through telephone interface 160 out port 70 to the communications system 60. The data is then received by the device 10' using port 70' and telephone interface 160', demodulated by modem 110', and directed by microncontroller 120' to the encrypt/decrypt device 130' for decryption. The decrypted data is then directed out port 90' by the microcontroller 120' and into computer 40'. After the file transfer is complete, the devices preferably return to ciphertext voice modes 340 and 340'.

Of course, a file could be transmitted from computer 40' to computer 40 in a reverse direction but identical manner. However, it should be understood that one cannot simply transmit a facsimile between facsimile machines 30, 30' in ciphertext, or encrypted mode such as was done in plaintext mode, as a secured session has already been commenced over the communications system 60 for example, hence rendering it impossible to simultaneously commence a conventional facsimile protocol session thereover.

Figure 8:
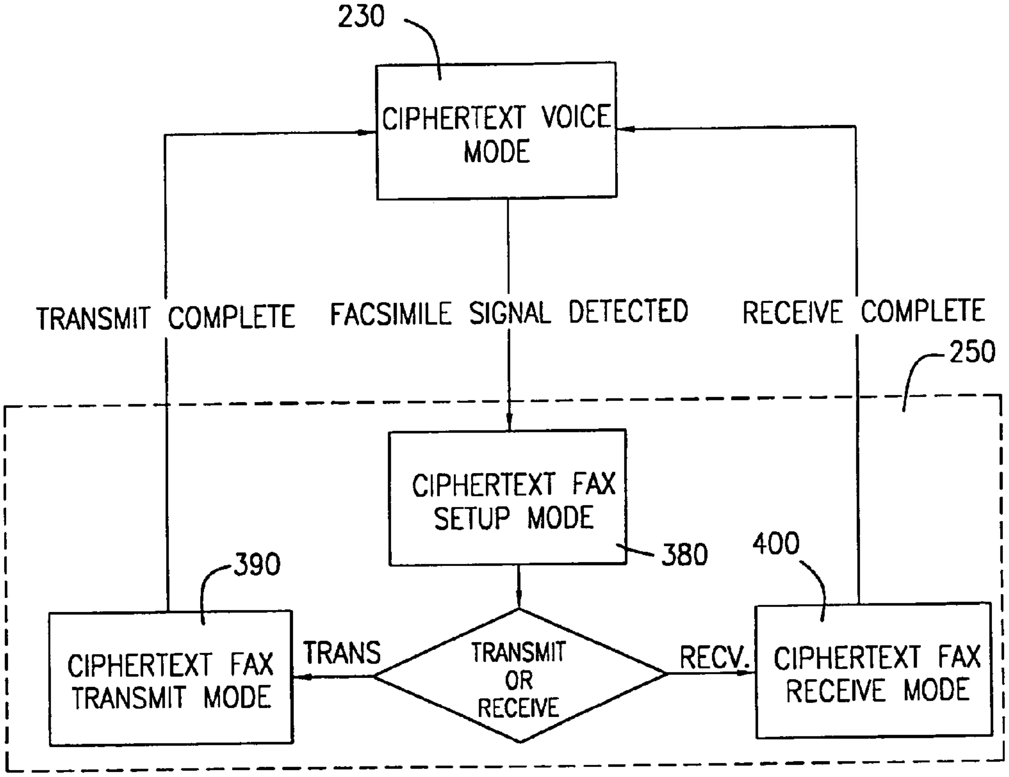
FIG. 8 illustrates a fifth operations flow diagram according to the instant invention.

Therefore, and referring now also to FIG. 8, to conduct encrypted facsimile transmissions between facsimile machines 30, 30' the devices 10, 10' have their modems 100, 100' respectively coupled to the phone ports 80, 80'. These modems 100, 100' respectively monitor signals received at ports 80, 80' for at least one standard facsimile signal (i.e. DIS signal). Upon detection of a facsimile signal, the modems 100, 100' respectively negotiate a standard session with the locally connected facsimile machine 30,30' consistent with the capabilities of the secured session as has been set forth.

As is well known modems 100, 100' can be configured to respectively provide an output signal to the microcontrollers 120, 120' upon detection of a standard facsimile transmit or receive signal (i.e. DIS signal). Upon receipt of one of these signals, preferably the receive facsimile signal, one device 10, 10' can be configured to transmit this status to the other device 10, 10'. For example, and referring again to the same communication session as has been described with regard to plaintext and ciphertext voice communications, the users of the devices 10, 10' may wish to transmit a document from facsimile machine 30 to facsimile machine 30' in an encrypted manner. To effectuate such a transmission, the users may agree to do such, and a document placed into facsimile machine 30 and a start button activated thereon for example. On the other end, a start button may also be activated on the facsimile machine 30' which has had no document previously placed into its page feeder as it is intended to receive the document from facsimile machine 30. It should be understood that conventionally at this point facsimile machines 30 and 30' would negotiate a communications session over communications system 60 for transmitting the document placed in the sheet feeder of the facsimile machine 30. However, due to the secure communications session already in place between modems 110, 110' of the devices 10, 10' over communications system 60 such is not feasible using conventional facsimile technology.

When the document was placed in facsimile machine 30 and the start button activated, a signal attempting to commence a facsimile session was transmitted by the facsimile machine 30 and received by the device 10 through phone port 80. This signal is indicative of attempting to transmit a facsimile document. Because modem 100 is monitoring the phone port 80, as has been set forth, it can detect this signal and in turn signal the microprocessor 120. Similarly, when the send button is activated on the facsimile machine 30' a signal attempting to commence a facsimile session was transmitted by the facsimile machine 30' and received by the device 10' through phone port 80'. This signal is indicative of an attempt to receive a facsimile document. Because modems 100, 100' are monitoring the phone ports 80, 80', as has been set forth, they can individually detect these signals. Upon either unit detecting one of these signals, but preferably the receiving unit, i.e. 10' in this example, a control signal can be passed over the communication session between modems 110, 110' of devices 10, 10' such that the microcontrollers 120, 120' can direct the devices 10, 10' to enter ciphertext facsimile mode. Upon such a direction the device 10 enters ciphertext facsimile setup mode 380. Therein, the phone port 80 is coupled to modem 100, the secure communications session is continued using modem 110 and the audio codec 150 is preferably uncoupled from phone port 80' if both the fax machine 30 and telephone 20 are coupled to port 80. Correspondingly, the device 10' enters ciphertext facsimile setup mode 380' wherein phone port 80' is coupled to modem 100', the audio codec 150' is uncoupled from phone port 80' if both the fax machine 30' and telephone 20' are coupled to port 80', and the secure communications session is continued using modem 110'.

Accordingly, the modem 100 of the device 10 negotiates a facsimile session with facsimile machine 30 and modem 100' of device 10' negotiates a facsimile session with facsimile machine 30', this fax session preferably being consistent with the capabilities of the secure session as determined by the microcontroller 120. Thereafter, the device 10 enters ciphertext facsimile transmit mode 340 and device 10' enters ciphertext facsimile receive mode 400'. Therein, data is transmitted from the facsimile machine 30 to modem 100 of the device 10 through phone port 80 and telephone interface 160. This data is demodulated by the modem 100 of the device 10 and directed by the microcontroller 120 to encrypt/decrypt device 130 which encrypts the data consistent with the security key previously negotiated between the devices 10, 10'. This encrypted data is then directed by the microcontroller 120 to the modem 110 and transmitted out line port 70 through telephone interface 160 to the communications system 60. The encrypted data is received by the device 10' from the communications system 60 through the port 70' and telephone interface 160', demodulated using modem 110' and directed by the microcontroller 120' to the encrypt/decrypt device 130' which decrypts the data consistent with the key previously negotiated between the devices 10, 10'. The microcontroller 120' then directs the decrypted data to the modem 100' which modulates the data consistent with the session commenced between it and the facsimile machine 30'. The modulated data is then sent to phone port 80' though the telephone interface 160' to the facsimile machine 30' where it is received. After the facsimile transmission is complete the devices 10, 10' preferably returns to ciphertext voice modes 340, 340'.

Advantageously, this all appears transparent to the users who only see facsimile machine 30 transmitting a facsimile document and facsimile machine 30' receiving a facsimile document. Of course, a facsimile document could be sent from facsimile machine 30' to facsimile machine 30 in the reverse but identical manner.

Use with Proprietary Hardware

The use of proprietary herein is meant to indicate any electronic device adapted to communicate over communications system 60. As set forth the device 10 preferably incorporates a standard format data port 90. In the preferred form this takes the form of an RS-232 type port. As stated, an advantage of incorporating such a standard port enables one to utilize the device 10 with any device, e.g., computer, cell phone, notebook computers, wireless modems, etc., capable communicating via the standard interface, i.e. in the preferred form RS-232.

Accordingly, the device 10 is further capable of being utilized with a variety of proprietary devices, i.e. Personal Data Assistants (PDAs) for example and other electronic devices. One such device is marketed under the tradename Magicom by Copytele, Inc., the assignee hereof. This device permits for handwriting on a pad to be digitized and transmitted to a like Magicom device for display. These Magicom devices preferably use a touch-screen as both a display and input device.

Similar as for the computer 40, a proprietary device is preferably coupled to the device 10 using the data port 90. A request for service can similarly be received by the device 10 using port 90 and microcontroller 120. Upon such a request for service, the device 10 handles it consistently as has been set forth for a modem request.

Encryption—Key Generation and Exchange

Any suitable encryption/decryption device 130, 130' can be utilized as is well known in the art. For example, a Diffe-Hillman public/private key algorithm may be implemented. Preferably though, the encryption/decryption device 130 takes the form of a Harris Model Citadel CCX, using a Tripe DES or AES algorithm. The choice of a hardware encryption device generally results in more robust cryptographic implementation than software alone, generally resulting for example from better random number generation. However, any suitable means for encrypting and decrypting data as is well known in the art can be used. For example, the microcontroller 120 could perform the encryption/decryption software algorithms.

Preferably a new session key is generated for each point-to-point real-time communications session using standard public/private key technology and DSP 140. In other words, for each session the device 10 using the DSP 140 generates a new public/private key combination for use with another like device (10') for encrypting and decrypting messages therebetween using conventional techniques. Likewise, the device 10' preferably generates a new public/private key combination. The public portions of these keys are preferably exchanged, and the respective private portion is combined with the received public portion by each encryption/decryption device 130, 130' for encrypting and decrypting in according with the present invention.

Each device 10 preferably also includes a permanent public/private key combination for non point-to-point transmissions, i.e. over the Internet. In these types of non-real-time transmissions, if the devices 10, 10' were to exchange their public/private key as is done for point-to-point transmissions the key would change before the file or other transmission, i.e. E-mail, was recovered and would hence render it unrecoverable, as the devices 10, 10' preferably generate a new public/private key combination for each communications session. It should also be recognized that this feature further permits for file securing within the computer 40 for example by a user sending data to the device 10 and then recovering the encrypted data from it. As the permanent decryption key is available in the device 10 and not the computer 40, separation of the device 10 from the computer 40 acts as a means of securing data residing in the computer 40.

More particularly, a user, utilizing suitable drivers as is well known to those possessing ordinary skill, could instruct computer 40 to transmit a file to the device 10 for encryption with the permanent key. This encrypted file could then be re-transmitted back to the computer 40. At this point, using a suitable utility the user could erase the non-encrypted version to prevent unauthorized access to the file. Now that the file is in encrypted format, the user simply needs to follow the same steps with the device, this time instead of decrypting the file for access thereto. In this way, even if the computer 40 becomes lost or stolen, unauthorized access to the encrypted file could still be frustrated by adequately safeguarding the device 10.

Further, of course, conventional digital signature technology can be utilized by the devices 10, 10' to verify the identity of devices 10, 10' and hence their owners or operators.

Simultaneous Voice/Facsimile/Data Transmission

When operating in a ciphertext mode, it should be noted that only digital data is transmitted between the modems 110, 110' of the devices 10, 10'. For example, in ciphertext voice mode, audio data received from either telephone 20, 20' is digitized by the audio codec 140, 140'. Similarly, in the ciphertext data mode digital data received from the data port 90, 90' is transmitted between devices 10, 10'. Likewise, in the ciphertext facsimile mode, only computerized data, which is no longer in facsimile format, is transmitted between the devices 10, 10'. Accordingly, using multiplexing techniques which are well know to those possessing ordinary skill in the art, one can easily simultaneously transmit data, or for example a computer file, between computers 40, 40' during facsimile transmission and/or a full-duplex voice conversation, and still encrypt all information (voice and/or facsimile and data). In order to facilitate such, it is necessary to have the audio codecs 150, 150' coupled to the respective phone port 80, 80' even while data is being transmitted between the data ports 90 and 90'. Accordingly, it is also necessary to couple the modems 100, 100' to the phone port 80, 80' to monitor for a facsimile commencement signals for simultaneous transmission of facsimile data and a computer file for example. In simultaneous modes, headers for each packet can be used, as is well known in the art, to distinguish between data types (i.e. whether the data associated with that particular packet is fax, computer, voice or that of a proprietary device for example). As will be readily understood by those possessing ordinary skill in the pertinent art though, any other suitable form of multiplexing the data could of course be used.

Figure 9:
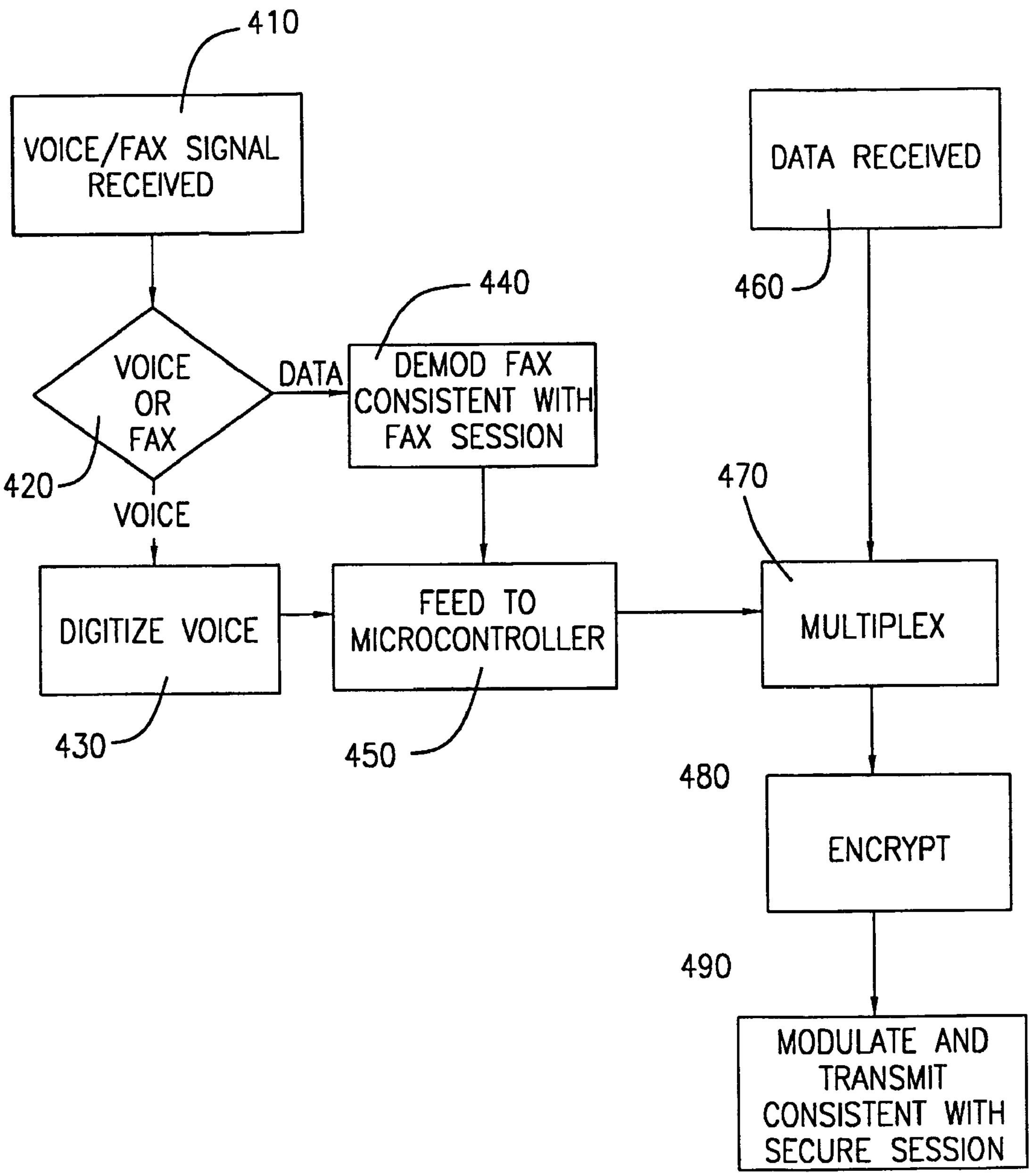
FIG. 9 illustrates a sixth operations flow diagram according to the instant invention.

Referring now also to FIG. 9, if the device 10 uses a common port 80 for connecting to both the facsimile machine 30 and phone 20, voice and facsimile signals are received 410 thereon. As the audio codec 150 is decoupled from the phone port 80 when a facsimile signal is detected on the phone port 80, the microcontroller 120 is capable discerning 420 whether the signal received in step 410 is a facsimile or voice signal. As set forth, if the signal is a voice signal it is digitized 430. If the signal is a facsimile signal it is demodulated 440 consistent with the session between the fax machine 30 and modem 100 and capabilities of the secure session. Either way, the received signal is fed 450 to the microcontroller 120 for directing. If simultaneously, data is received 460 on the data port 90, this data is also directed to the microcontroller, wherein it is multiplexed 470 with the data representative of the signal received on the phone port 80 using conventional techniques. This multiplexed data is then directed by the microcontroller 120 to the encrypt/decrypt device 130 for encryption 480 according to the key that was previously negotiated between the devices 10, 10'. Thereafter, the encrypted multiplexed data is fed to the modem 110 for modulation and transmission 490 across communications system 60 using line port 70.

Figure 10:
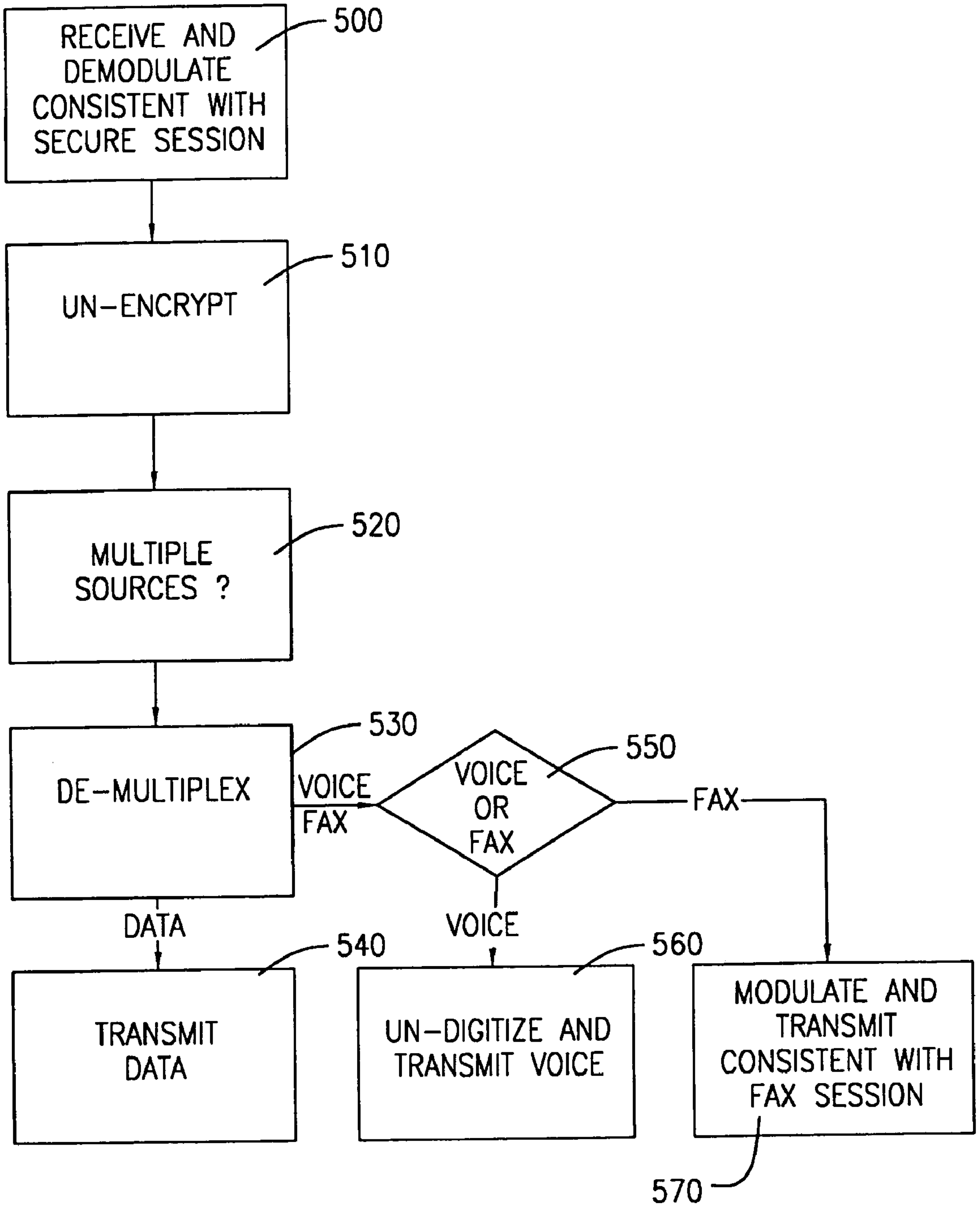
FIG. 10 illustrates a seventh operations flow diagram according to the instant invention.

Referring now also to FIG. 10, the signal is received using the line port 70' and demodulated 500 using modem 110'. The data is then fed to the encrypt/decrypt device 130' for decryption 510. Preferably, a flag within the data itself is read by the microcontroller 120' which indicates to it that the decrypted data includes multiple sources (i.e. is multiplexed) 520. The data is then de-multiplexed 530 using the microcontroller 120'. Data intended for data port 90' is fed thereto 540. Data intended for phone port 80' must be distinguished 550 into voice and facsimile data, preferably again using a flag for example, or any other suitable means. Voice data is then preferably fed to the audio codec 150' for un-digitization and audible transmission over phone port 80', and fax data is fed to the modem 100' for modulation for transmission over the port 80' to facsimile machine 30'.

If separate ports are provided within the devices 10, 10' for respective connection to facsimile machine 30 and telephone 20, data from these sources can also me multiplexed, and the audio codecs 150, 150' need not be decoupled from the phone ports 80, 80' during facsimile transmissions.

Non-Point-to-Point Transmissions

Another area of concern lies in securing non-point-to-point file transmissions. It is often desirable to transmit a file to a repository where it can later be retrieved by the intended recipient. Another example is an attachment to an e-mail. However, securing the transmitted file from unauthorized or unintended interception or reception is still desirable.

Figure 11:
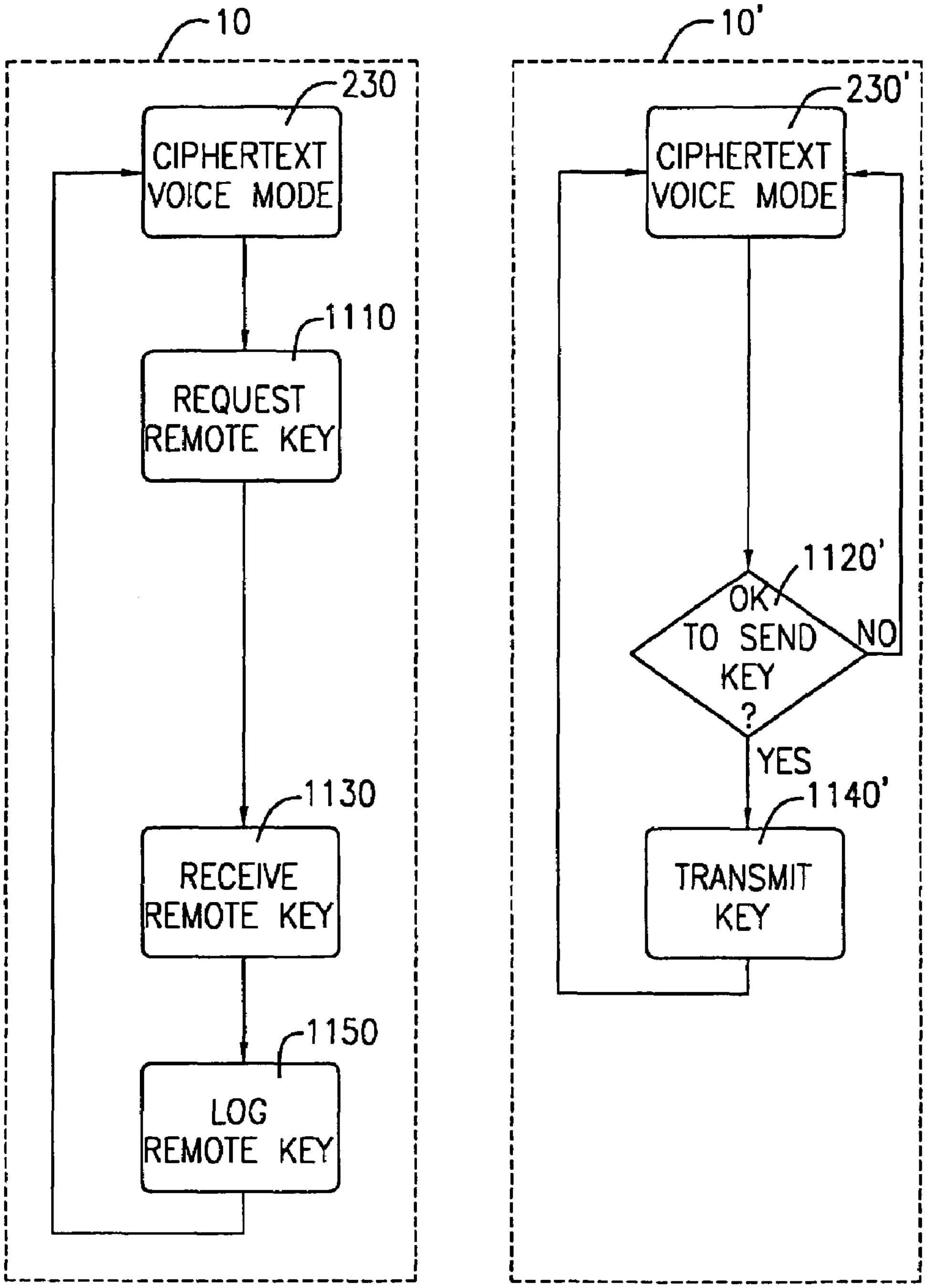
FIG. 11 illustrates a flow diagram indicative of a preferred key exchange method for non-contemporaneous communications according to the present invention.

Referring now to FIG. 11, therein is illustrated a first step for securing e-mail attachments according to a preferred embodiment of the present invention. Keys must first be exchanged. As was set forth, each device 10, 10' can be respectively coupled to a computer 40, 40'. For example, by using a serial port on each PC 40, 40'. When a first user having access to PC 40 and device 10 wishes to send an e-mail with a secured attachment to a second user having access to PC 40' and device 10' the following steps can be performed to securely transmit the attachment.

Using the PC 40, the first user can prepare an e-mail using any conventional software application such as Eudora or Groupwise for example. One or more files to be attached can be secured either prior to being attached, or after by using an appropriate plug-in application, as is well known. This can be accomplished by providing a button or menu option for example which calls a subprogram for securing the one or more files for transmission after they have been attached. Regardless of when invoked, an encryption key is obtained and used to encrypt the one or more files for transmission.

Using the PC 40, the first user identifies the intended recipient of the e-mail and hence the secured attachments. An internal database in the PC 40 can then be searched to determine whether an encryption key is on file for the PC 40 for the intended recipient. If it is not, the PC 40 prompts the first user that a key is not on file and must first be obtained. According to a preferred embodiment, the first user causes a session in ciphertext voice mode 230 to be established between the devices 10, 10' as has been set forth above. According to a particularly preferred form of the invention, the PC 40 prompts the first user for a telephone number for the intended recipient which is then passed to the device 10. The device 10 then dials the entered phone number using the modem 10 and proceeds to enter ciphertext voice mode 230. The user's PC 40 is preferably signaled upon successful commencement of the ciphertext voice mode 230. Referring now to FIG. 11, the PC 40 preferably instructs the device 10 to request 1110 a security key from the device 10'. The device 10' then indicates a request for a key has been received and waits for a user thereof to approve the key transfer 1120'. Approval can be indicated either by pressing a key on the device or by using the PC 40' for example. If it is not "alright" to send the key, the device 10' either responds negatively to the request 1110 or ignores it and continues to operate in ciphertext voice mode 230'. If the user of the device 10' indicates it may transmit a key to the device 10, the device 10' transmits 1140' a key which is received 1130 by the device 10. The received key is then stored 1150 by the PC 40 and associated with the intended recipient (i.e., user of the device 10').

Figure 12:
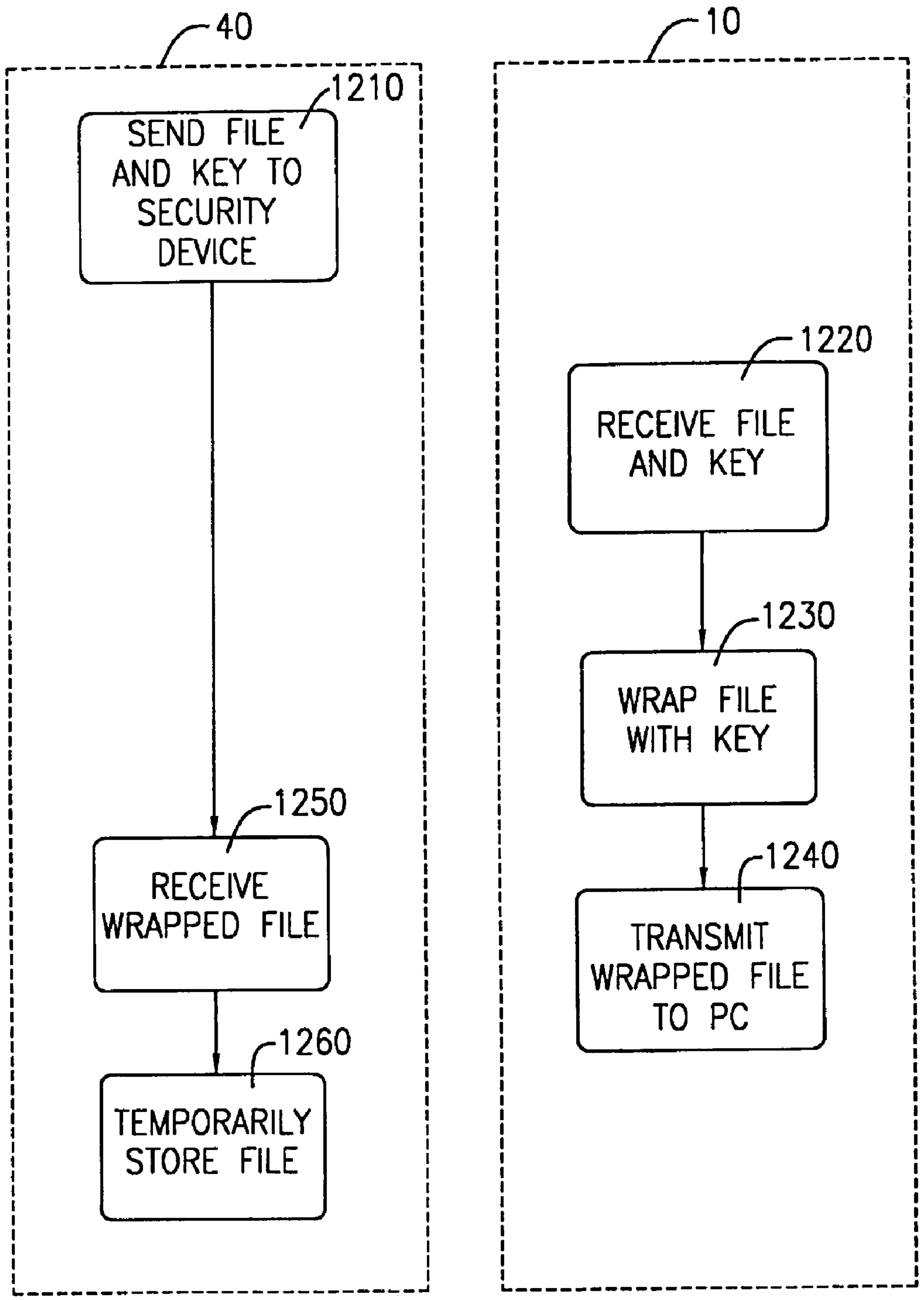
FIG. 12 illustrates an attachment encryption technique according to a preferred form of the present invention.

Referring now also to FIG. 12, the selected file for secured transmission, along with the public key for the intended recipient which is now on file in the PC 40 is then sent 1210 to the device 10. The device 10 receives 1220 the file and key and wraps 1230 the received file using the received recipient's public the sender's private key as is well known. The wrapped file is then sent 1240 to the PC 40 which receives 1250 it and temporarily stores 1260 it for transmission to the intended recipient. The encrypted file is then attached to the e-mail and transmitted to the intended recipient using conventional techniques for example. A realized advantage is that the e-mail is not encrypted, but the attachment is. Accordingly, the recipient does not need to go through the effort of unencrypting the entire e-mail just to determine what it is in regards to.

Figure 13:
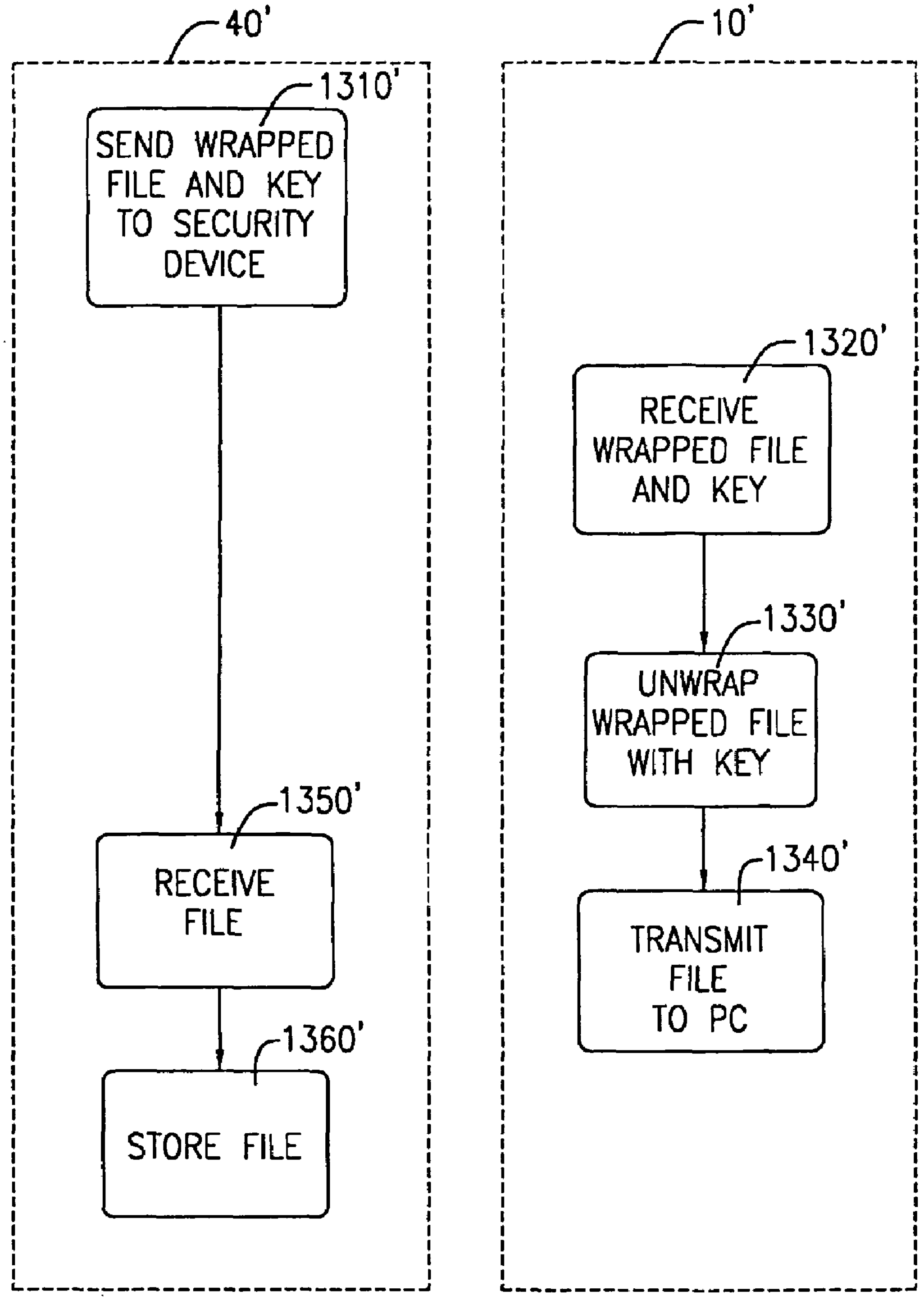
FIG. 13 illustrates an attachment decryption technique according to a preferred form of the present invention.

Referring now also to FIG. 13, therein is illustrated a preferred method for unencrypting and hence providing access to the transmitted file, or any other data which was encrypted according to the present invention. The PC 40', after receiving the encrypted file sends 1310' the encrypted file to the device 10'. As is known, depending upon what encryption/decryption technique is used key data may also need to be sent to the device 10'. An example of such an encryption/decryption technique is a public/private key algorithm where the public key of the device 10 is preferably sent to the device 10'. Upon receiving 1320' the encrypted file and any associated security data, the device 10' unwraps 1330' the encrypted file according to conventional techniques. The device 10' then sends 1340' the unwrapped file to the PC 40' which upon receiving it 1350' can store it 1360' locally using conventional techniques.

Of course, if public/private key technology is used, the private portion of the recipient's key is combined with the public portion of the sender's key which was supplied to the device 10' when the device 10' transmitted 1140' the sender's public key portion. Further, passwords can be provided and also used to wrap the file using conventional encryption techniques. In such an event, the wrapped file, the device 10' and the password are advantageously required to unencrypt the attachment.

According to a preferred form of the invention, transmissions of secure e-mail attachments to multiple recipients can be accomplished by including an appropriately encrypted version for each intended recipient in a single e-mail each being separated by a demarcation packet. In other words, each e-mail attachment preferably includes separately versions of the same attachment for each intended recipient having demarcation packets interposed between them. For example, if user A intends to send an e-mail with an encrypted attachment to users B and C, the e-mail attachment preferably includes an encrypted portion that B can de-crypt and an encrypted portion C can decrypt using their devices 10 respectively. As the entire encrypted attachment is provided to each of user's B and C's devices 10, each device 10 identifies that portion of the encrypted file it can decrypt and decrypts that portion. As the entire attachment is preferably encrypted separately using each user's appropriate key as has been set forth, each user's decrypted portion represents the entire attachment A intended to transmit to them. Hence the encrypted file includes the entire attachment encrypted using users A's and B's keys and the entire attachment encrypted using users A's and C's keys. The demarcation packets are preferably specific to each device 10. For example, referring again to the immediately preceding user A, B and C example, the attachment preferably takes the form of: user B's device demarcation packet, the intended file suitably encrypted for user B's device to decrypt, user C's device demarcation packet, and finally the intended file suitably encrypted for user C's device to decrypt. When the file is to be decrypted, each device 10 preferably scans the entire attachment for it's demarcation packet, and upon identifying it decrypts the appropriate portion of the attachment as has been described. The demarcation packets can be associated with each device's 10 public key for example.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

What is claimed is:

1. A method for selectively enhancing a voice telephone call from a first location to a second location over a public switched telephone network, comprising receiving audio signals from a conventional telephone using a first device positioned at said first location; and, in a first mode, passing said received audio signals to said public switched telephone network in a substantially unaltered manner; and, in a second mode, generating data indicative of said received audio signals using said first device; multiplexing said generated data with other data desired to be communicated using said first device; and, transmitting said multiplexed data over said public switched telephone network; wherein, said transmitted data is suitable for being received from said public switched telephone network and de-multiplexed to generate reproduced audio signals indicative of said received audio signals and said other data by a second like device.

2. The method of claim 1, wherein said transmitted data is unencrypted.

3. A method for enhancing a voice telephone call from a first location to a second location over a public switched telephone network, comprising:

receiving audio signals from a conventional telephone using a first device positioned at said first location;

generating data indicative of said received audio signals using said first device;

multiplexing said generated data with other data desired to be communicated using said first device;

encrypting said multiplexed data; and, transmitting said encrypted data over said public switched telephone network, wherein, said transmitted data is suitable for being received from said public switched telephone network, decrypted and de-multiplexed to generate reproduced audio signals indicative of said received audio signals and said other data by a second like device.

* * * * *